United States Patent
Kuznetzov et al.

(10) Patent No.: US 9,852,198 B1
(45) Date of Patent: *Dec. 26, 2017

(54) METHOD AND SYSTEM FOR FAST GENERATION OF FILE SYSTEM SNAPSHOT BITMAP IN VIRTUAL ENVIRONMENT

(71) Applicants: Alexay N. Kuznetzov, Moscow (RU); Alexander G. Tormasov, Moscow (RU); Kirill S. Korotaev, Moscow (RU); Dmitry I. Monakhov, Moscow (RU)

(72) Inventors: Alexay N. Kuznetzov, Moscow (RU); Alexander G. Tormasov, Moscow (RU); Kirill S. Korotaev, Moscow (RU); Dmitry I. Monakhov, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 1079 days.

This patent is subject to a terminal disclaimer.

(21) Appl. No.: 13/776,873

(22) Filed: Feb. 26, 2013

Related U.S. Application Data

(63) Continuation of application No. 13/221,406, filed on Aug. 30, 2011, now Pat. No. 8,386,428, which is a (Continued)

(51) Int. Cl.
G06F 17/30 (2006.01)

(52) U.S. Cl.
CPC .............. *G06F 17/30575* (2013.01)

(58) Field of Classification Search
CPC .......... B65H 2402/412; B65H 2701/32; B65H 2701/34; B65H 2701/533;
(Continued)

(56) References Cited

U.S. PATENT DOCUMENTS 7,246,200 B1 * 7/2007 van Rietschote ..... G06F 9/4403
709/220
7,383,327 B1 6/2008 Tormasov et al.
(Continued)

OTHER PUBLICATIONS

Search report in Eurasian application No. 201201060, dated Jun. 24, 2013.

*Primary Examiner* — Mark D Featherstone
*Assistant Examiner* — Navneet Gmahl
(74) *Attorney, Agent, or Firm* — Bardmesser Law Group

(57) ABSTRACT

A method, system and computer program product for generation and management of incremental backups of VEE file system using bitmaps. The proposed method allows users to roll back to any previous version or state of the VEE file system and to instantiate this version using the data encapsulated in virtual disk storage (i.e. file system) of the VEE. A number of VEEs run on a Host Operating System of the computer system. One of the VEEs implemented on the computer system is designated to generation and management of backups of the virtual disk data of the other VEEs without freezing the file system during the entire backup process. A special tracing application runs on the designated VEE for generating the bitmap of a file system snapshot. The user can also set up a time for generating a backup or create a schedule for automatically generating the backups at critical points.

15 Claims, 6 Drawing Sheets

Related U.S. Application Data continuation of application No. 12/363,736, filed on Jan. 31, 2009, now Pat. No. 8,010,495, which is a continuation-in-part of application No. 11/739,131, filed on Apr. 24, 2007, now Pat. No. 7,987,432, said application No. 13/221,406 is a continuation-in-part of application No. 12/363,736, filed on Jan. 31, 2009, now Pat. No. 8,010,495.

(60) Provisional application No. 60/823,988, filed on Aug. 30, 2006, provisional application No. 60/745,532, filed on Apr. 25, 2006, provisional application No. 61/027,275, filed on Feb. 8, 2008.

(58) Field of Classification Search
CPC  B65H 2701/534; B65H 49/24; B65H 49/322; B65H 49/328; B65H 75/403; B65H 75/4471
See application file for complete search history.

(56) References Cited

U.S. PATENT DOCUMENTS

| | | |
|---|---|---|
| 7,788,593 B1 | 8/2010 | Grechishkin et al. |
| 7,926,054 B2 | 4/2011 | Sonderegger et al. |
| 8,055,745 B2 * | 11/2011 | Atluri ................. G06F 11/1453 709/217 |
| 2005/0038836 A1 * | 2/2005 | Wang ................... G06F 3/0601 |
| 2005/0198239 A1 | 9/2005 | Hughes |
| 2006/0242211 A1 * | 10/2006 | Becker ............... G06F 11/1456 |
| 2007/0083722 A1 * | 4/2007 | Per ..................... G06F 11/1451 711/162 |
| 2007/0234334 A1 | 10/2007 | Araujo, Jr. et al. |
| 2007/0244926 A1 | 10/2007 | Vitanov et al. |

\* cited by examiner

METHOD AND SYSTEM FOR FAST GENERATION OF FILE SYSTEM SNAPSHOT BITMAP IN VIRTUAL ENVIRONMENT

CROSS-REFERENCE TO RELATED APPLICATIONS

The present application is a continuation of application Ser. No. 13/221,406, filed on Aug. 30, 2011, entitled METHOD AND SYSTEM FOR FAST GENERATION OF FILE SYSTEM SNAPSHOT BITMAP IN VIRTUAL ENVIRONMENT, which is a continuation of application Ser. No. 12/363,736, filed on Jan. 31, 2009, entitled METHOD AND SYSTEM FOR FAST GENERATION OF FILE SYSTEM SNAPSHOT BITMAP IN VIRTUAL ENVIRONMENT, which claims priority to the U.S. Provisional Patent Application No. 61/027,275, filed Feb. 8, 2008, entitled METHOD AND SYSTEM FOR FAST INCREMENATL BACKUPS IN VIRTUAL ENVIRONMENT incorporated herein by reference in its entirety.

Application Ser. No. 12/363,736 is a continuation-in-part of U.S. patent application Ser. No. 11/739,131, filed on Apr. 24, 2007, entitled SEAMLESS INTEGRATION AND INSTALLATION OF NON-NATIVE APPLICATION INTO NATIVE OPERATING SYSTEM, which is a non-provisional of U.S. Provisional Patent Application No. 60/823,988; Filed: Aug. 30, 2006, entitled SEAMLESS INTEGRATION AND INSTALLATION OF NON-NATIVE APPLICATION INTO NATIVE OPERATING SYSTEM, and is a non-provisional of U.S. Provisional Patent Application No. 60/745,532; Filed: Apr. 25, 2006, entitled SEAMLESS INTEGRATION OF NON-NATIVE APPLICATION INTO NATIVE OPERATING SYSTEM, which are all incorporated herein by reference in their entirety.

BACKGROUND OF THE INVENTION

Field of the Invention

The present invention relates generally to Virtual Execution Environment technology and, more particularly, to a method and system for generation and management of incremental backups using bitmaps of file system snapshots.

Background Art

In the past decade, capabilities of computer systems have increased significantly. Computer systems process large volumes of data, which is changed or updated constantly. In order to track changes of data, files located on a system Hard Disk Drive (HDD) are usually copied, and a system data backup based on these files is created. This enables a user to access previous versions of files, as well as to protect data from possible system failure.

Typically, data backups performed on a physical machine do not require saving of any system configuration parameters, because the structure of the physical machine remains the same. Thus, making the snapshot of data of the HDD is sufficient for generating a backup. Conventional data snapshot is generated by an Operating System (OS) of the physical machine.

The industry trend of virtualization and isolation of computer system resources makes the task of generating backups more complex. A Virtual Execution Environment (VEE), such as, for example, a Virtual Machine (VM) or a Virtual Private Server (VPS) is a type of an isolated VEE that runs on the same physical machine simultaneously.

Virtualization allows running a number of VEEs on the same physical machine or processor. Thus, scheduling and controlling efficient backups of data among numerous VEEs becomes even more crucial. Furthermore, configuration of each of the VEEs can be changed by a user. Thus, saving snapshots of all previous states of a particular VEE into a backup is critical.

Typically, data backups are performed by system administrators according to backup schedules. With VEEs, it is important to allow users to perform backups at any time, when the state of the VEE is about to change. A snapshot used for a backup of a VEE typically includes a bitmap of a virtual file system. The bitmaps are normally parts of backups generated based on disk image (i.e., block level backups).

Generating a bitmap of a snapshot of an empty VEE file system or a snapshot of VEE file system containing small volume of data can be done relatively fast, in a matter of a few seconds. However, generating a bitmap of a snapshot of VEE file system populated with a lot of data takes a long time, which can be in the hundreds of seconds. During this time, all data contained in the VEE file system is automatically frozen and is not accessible to users. Conventionally, this can involve freezing an entire disk drive. Obviously, this is inconvenient for the users and makes the task of scheduling and generation of backups problematic for system administrators. Such long delays may also be a violation of the Service Level Agreement.

Accordingly, there is a need for a system and a method for fast and efficient generation of bitmaps of snapshots of VEE file system without freezing the file system for the duration of the backup process.

SUMMARY OF THE INVENTION

The present invention is directed to method, system and computer program product for fast generation of a bitmap of a file system snapshot in a Virtual Environment.

The proposed method allows users to roll back to any previous version or state of the VEE file system and to instantiate this version using the data encapsulated in virtual disk storage (e.g., a file system) of the VEE. After the incremental backups of the virtual disk storage are generated, a user can see the differences between any of the backups generated at various times.

According to the exemplary embodiment, a number of VEEs run on the Host Operating System of the computer system (or a server). One of the VEEs implemented on the computer system is designated to generation and management of backups of the virtual disk data of the other VEEs without freezing the file system during the entire backup process. A special tracing application runs on the designated VEE. The user can also set up a time for generating a backup or create a schedule for automatically generating the backups at critical points. Thus, the backup process can be self-administered.

An incremental backup is generated by a designated Virtual Execution Environment (VEE) running on a physical machine, and the OS of the physical machine (or a physical server) is not directly involved in generation of the incremental backups of other VEEs' file systems. In the exemplary embodiment, the incremental backups can be taken without interrupting operation of the VEE and without freezing the VEE file system for the entire duration of a backup generation process.

As further options, the incremental backups are generated in response to VEE user requests. The write operations for at least one other VEE from the plurality of VEEs are continued when the snapshot for another VEE is generated. The snapshot in step (e) can be generated as a next snapshot of the target VEE's file system based on the bitmap of the file system snapshot and a prior snapshot. The consistent snapshot of the VEE's file system is generated as a snapshot of a VEE image file containing the VEE's file system. Also, additional actions may be performed to guarantee consistency of the image, such as changing a setting or having a procedure running inside the VEE providing internal cache resetting, data synchronization, checkpoint placing and so on.

Alternatively, the consistent snapshot of the VEE's file system is generated for the VEE's file system from within the VEE. For example, a VEE (VM) image file may be a single file when viewed from storage device root directory. From the point of view of a VM user, the VM contains an isolated file system with multiple files and directories. The internal file system of the VM is processed for the snapshot.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
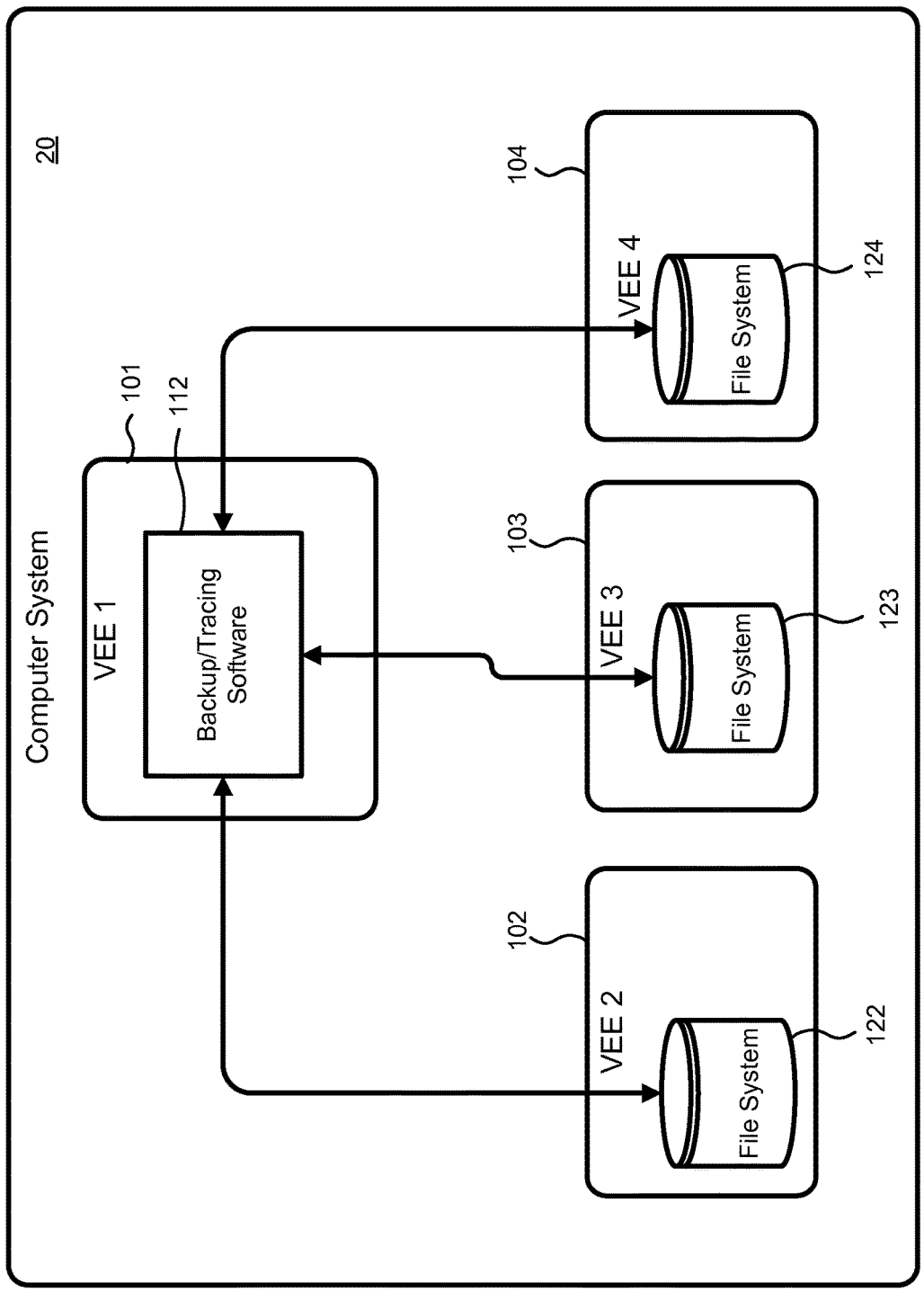
FIG. 1 illustrates a designated VEE architecture, in accordance with an exemplary embodiment.

Reference will now be made in detail to the embodiments of the present invention, examples of which are illustrated in the accompanying drawings.

In the discussion herein, the following definitions are used:

A Virtual Execution Environment (VEE)—is a type of environment that supports program code execution, where at least a part of the real hardware and software required for running program code are presented as their virtual analogs. From the point of view of a user, the code within VEE runs as if it were running on the real computer system.

A Virtual Environment (VE, often referred to as a Virtual Private Server or VPS)—is one type of a VEE running on the same hardware system with a shared OS kernel and most of the system resources, where isolation of Virtual Environments is implemented on the namespace level. A VE is a closed set, or collection, of processes, system resources, users, groups of users, objects and data structures. Each VE has an ID, or some other identifier, that distinguishes it from other VEs. The VE offers to its users a service that is functionally substantially equivalent to a standalone server with remote access. From the perspective of an administrator of the VE, the VE should preferably act the same as a designated computer at a data center.

A Virtual Machine (VM)—is a type of an isolated VEE running on the same physical machine concurrently with other VEEs. Each VM instance executes its own OS kernel. Support of Virtual Machines is implemented using a Virtual Machine Monitor and/or a Hypervisor. An example of a VM is a VMware™ Virtual Machine or a Parallels™ Software International, Inc. Virtual Machine. In another example, the VM can be based on QEMU open source machine emulator (http:fabrice.bellard.free.frqemu/**).

The present invention relates to a method and system for providing bitmaps of snapshots of file system trees and for generation and management of backups and incremental backups of file system. Such bitmaps can be file-based, sector-based or block-based, where the relevant bit indicates which units (files, sectors or blocks) need to be copied to backup storage. The invention is generally applicable to most modern file systems, such as NTFS, HFS, Reiser FS, Linux, etc.

As an exemplary embodiment, the VEE file system may be checkpointed by snapshots or be backed up using the approach described herein. The proposed method allows users to roll back to any previous state of file system trees or the VEE file system (i.e., virtual disk storage) and to instantiate this version using the data encapsulated in virtual disk storage of the VEE.

As one embodiment, the VEE processes and the VEE file system are described, keeping in mind that any process or group of processes may be considered as the VEE and any file system tree accessed by the processes may be further considered as the VEE file system or the VEE virtual disc storage. It also may be available for any number of group of processes identified above as VEE.

As will be shown below, as an example of the backing up process, the state of a portion of the file system tree may be protected at a certain point in time as a file system backup or by using snapshot bitmaps. After the incremental backups of the virtual disk storage are generated, a user can see the differences between any of the incremental backups generated at various times.

The proposed method provides for a possibility of preparing a partial snapshot (and backup) for protection data contained in a part of a storage device, or the storage device partition. Such a part of the storage device may be a collection of files, inodes, operating system data, metadata and/or similar structures required for execution and restoration of the processes of interest. An example of a group of processes being associated with a certain area of the disk storage unit is a VEE having a private file system tree or a VEE file system being a part of the common file system.

According to the exemplary embodiment, a VEE runs on the computer system (e.g., a server) utilizing a part of the file system referred to as "a VEE data." It may be a shared part of the file system accessible by several VEEs and/or by a private part of the operating system where only a designated VEE can modify data. The VEE is an example of group of processes for which the exemplary embodiment can be utilized.

When the user generates a command for protection of the VEE data, the procedure of snapshot bitmap creation is started. First, a collection of data related to the process is prepared. The data may be inodes or files or similar data structures which should be protected. At the same time, a bitmap related to units of the data storage is formed. It can be the full bitmap of the data blocks of the storage device, e.g., sectors or clusters.

Then, the bitmap may be updated to reflect used blocks of the storage device. The full bitmap is then updated to reflect blocks related to the process or to the directory sub-tree of interest. Then, the system may be temporarily frozen and a dedicated API required for bitmap updating is embedded into the system.

The dedicated API monitors events, where events are requests or calls to the storage system, and provides for a possibility for fast snapshot bitmap updating. When the dedicated API is installed, the system resumes normal operation and the process of bitmap updating is launched. The bitmap updating provides indication of blocks of the storage device related to the process of interest and may comprise all or any of the following procedures running in parallel.

First procedure provides iterative scan of the file tree and marks blocks of the storage device related to inodes related to the process of interest. The second procedure tracks requests to the storage device issued by the process of interest and marks corresponding blocks of the storage device in the snapshot bitmap as blocks of interest.

The third procedure tracks requests to the storage device issued by other processes and marks corresponding blocks of the storage device in the snapshot bitmap as blocks that may be ignored. Therefore, the snapshot bitmap can also comprise flags (e.g., two or more bits indicating that a particular block should be checked as a block of interest or as not a block of interest, that this block is of interest, but will be backed up later, that this block is of interest but is at the moment locked or otherwise inaccessible, etc.).

When the snapshot bitmap is created, the process or processes or group of processes of interest is frozen first, and the bitmap is updated with the last blocks being affected by the process. Then, the file system is frozen for snapshot organization, where the contents of blocks indicated by the bitmap are protected from writes. The last operation is resuming file system operation in snapshot operation mode. It should be noted that snapshot can be used for backing up data on a remote storage.

According to the exemplary embodiment, a number of VEEs run under the Host Operating System of the computer system (or a server). One of the VEEs implemented on the computer system can be designated to generation and management of incremental backups of the virtual disk data of the other VEEs without freezing the VEEs file system data for the duration of a backup generation process. A special tracing application runs on the designated VEE. The user of a VEE can also set up a time for generating a backup or create a schedule for automatically generating the backups at critical points. Thus, the backup process can be self-administered.

An incremental backup is generated by a designated VEE running on a physical machine, and a Host OS of the physical machine (or a physical server) is not directly involved in generation of the incremental backups. The incremental backups can be performed without interrupting operation of the VEE and without freezing the VEE file system for the entire duration of a backup generation process.

In the exemplary embodiment, incremental backups can be generated periodically according to a pre-set schedule. They can also be generated by VEE users based on a particular need. This can be important when a user is about to install a new application or to change the configuration of a VEE (such as a VM or a VPS), which could adversely affect the functionality of the VM or the VPS. In this case, the user can generate a backup reflecting the last state of the VEE file system prior to the new application being installed. This way, if the VM (or the VPS) gets corrupted by the new application, the user can return to any of the previous states of the file system of the VM (or the VPS).

The process of generation of an incremental backup of a VEE file system is typically done by generation of the snapshot of the virtual disk image. The disk image includes a bitmap of blocks of the file system. Generation of a bitmap of a relatively large file system can take a long time. During this time the file system is frozen and cannot be accessed by users, which presents a significant problem.

In the exemplary embodiment, the bitmaps needed for the incremental backups of the VEE file system are advantageously generated without freezing the VEE file system for the entire duration of the backup generation process. During the bitmap generation, the tracing application running as an operating system process (e.g., on the designated VEE) simultaneously provides tracking of the changes in the files of the file system for which the bitmap is being generated.

The generated bitmap of the file system does not reflect the changes in some of the files that have occurred during the bitmap creation, but the list of all of the files being changed is provided by the tracing application.

At this point the file system can be frozen and the bitmap can be corrected (i.e., synchronized) so it can include all the file changes. The tracing application running on the designated VEE scans all target VEE file system data related to changes in the files including, for example, changes in a file size, changes reflecting creation/deletion and renaming of a file and updates of file attributes. The updates of the file attributes can be detected by changes in the file directories.

Once the changes in the files of the target VEE file system are incorporated into the bitmap (i.e., the bitmap is synchronized), the target VEE file system is released so it can be accessed by users. Thus, the time period, during which the target VEE file system is frozen, is significantly shorter than the duration of generation of the bitmap of the snapshot of the file system. In other words, in the exemplary embodiment, the VEE file system can be frozen for just a few seconds, while bitmap generation can take up to several hundreds of seconds.

A VEE architecture employed in the exemplary embodiment is illustrated in FIG. 1. The target VEEs 102, 103 and 104 are running on the computer system 20. The designated VEE 101 has a backup software application 112 running on its Guest OS. Note that in this example the designated VEE 101 also runs on the computer system 20.

However, if the computer system 20 is implemented as a node of a computer cluster, the designated VEE 101 can be running on a different computer system. The VEEs 102, 103 and 104 have their own file systems 122, 123 and 124 respectively. The backup software application 112 generates the synchronized bitmaps of the file systems 122, 123 and 124 and the bitmaps are used for creation of incremental backups of each of the file systems 122, 123 and 124. Examples of such designated VEEs are also described in U.S. patent application Ser. No. 10/826,280, filed Apr. 19, 2004, and Ser. No. 11/556,233, filed Nov. 3, 2006, both of which are incorporated herein by reference in their entirety.

The backup software application 112 running on the designated VEE 101 simultaneously provides tracking of the changes in the files of the file systems 122, 123 and 124 for which the bitmap is being generated. The generated bitmap of the file system is not synchronized and does not reflect the changes in some of the files that have occurred during the bitmap creation.

The backup software application 112 freezes the file systems 122, 123 and 124 and the file changes of the respective file system are incorporated into the bitmap (i.e., the bitmap is synchronized). Then, the corrected bitmap is used in the incremental backup of the respective target VEE file system.

Note that rather than treating the entire file system of the computer as an entity that is "frozen" during backup, each VEE's file system (i.e., a subtree of the overall file system) can be identified as the one that is backed up. Such a VEE's file system (and only that file system) needs to be frozen (and usually the VEE that is chosen is idle), rather than the entire file system tree The exemplary embodiment provides efficient version control of logical data entities, such as files and directories located on the virtual disk drive. Note that in the exemplary embodiment, the virtual disk drive of each individual VEE can be backed up at a different time and backup process of file system of one VEE does not affect the back up process of file system of another VEE running on the same Host OS of the computer system. Alternatively, the VEEs can be implemented on a computer cluster. The designated VEE can be implemented on one node of the cluster and can generate the incremental backups of the virtual disks of the VEEs implemented on the other nodes of the cluster.

The exemplary embodiment is independent of a guest OS installed on a VEE. Therefore, the exemplary embodiment can be used for a file version control system or a more complex incremental backup system that are independent of the guest OS as well. The invention also may be used for supporting checkpointing of the file system, live migration of different kinds of the VEEs, incremental backup of VE file system and incremental image creation of the VE creation and so on. Thus, the exemplary embodiment can be used, for example, with all VMs/VPSs launched in a large corporate network.

Figure 2:
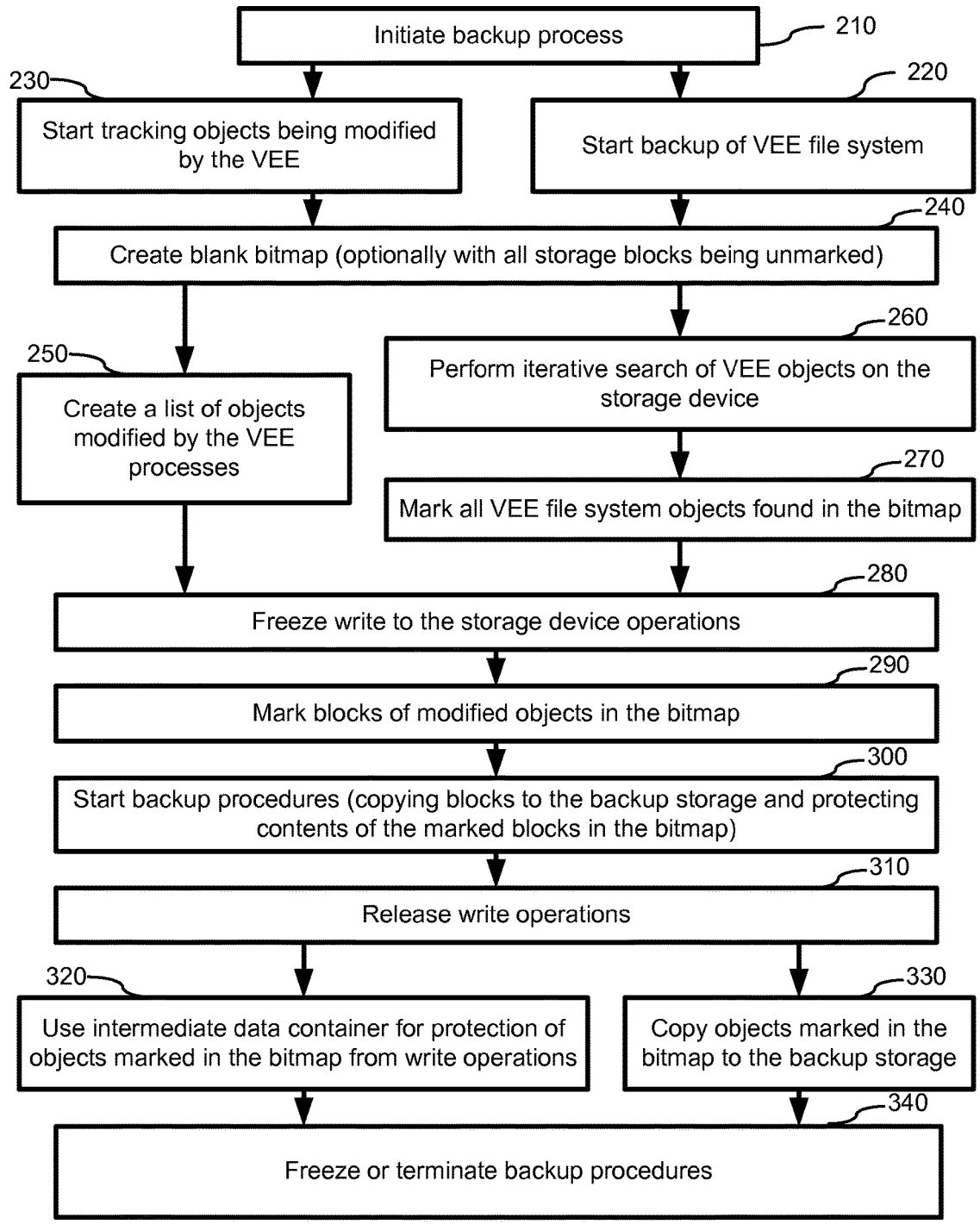
FIG. 2 illustrates a flow chart of a method for backup generation, in accordance with an exemplary embodiment.

A flow chart reflecting functionality of the backup software application 112 running on the designated VEE 101 is illustrated in FIG. 2. The tracing application 112 is started in step 210 and starts a backup of a target VEE file system (see step 220) and simultaneously starts tracking of the objects being modified by the VEE user processes (see step 230). The tracing application 112 creates a blank bitmap of the target VEE file system in step 240.

Optionally, the storage blocks can be unmarked on the bitmap created in step 240. The list of objects modified by the target VEE user processes is created in step 250. Then, in step 260, the tracing application 112 performs an iterative search of the target VEE file system objects on the storage device (e.g., virtual disk drive). The target VEE file system objects found in the bitmap are marked in step 270. The writes to the storage device are frozen in step 280.

The blocks of modified object are marked in the bitmap in step 290. The tracing application 112 starts backup procedures in step 300. The blocks of object are copied to the backup storage and the content of the marked (in the bitmap) blocks is protected in step 300. Then, the write operations (frozen in step 280) are released in step 310. The objects marked in the bitmap are protected from write operations by being placed into an intermediate data container in step 320. Then, the marked objects are copied to the backup storage in step 330. The backup procedures are stopped or frozen in step 340.

Figure 3:
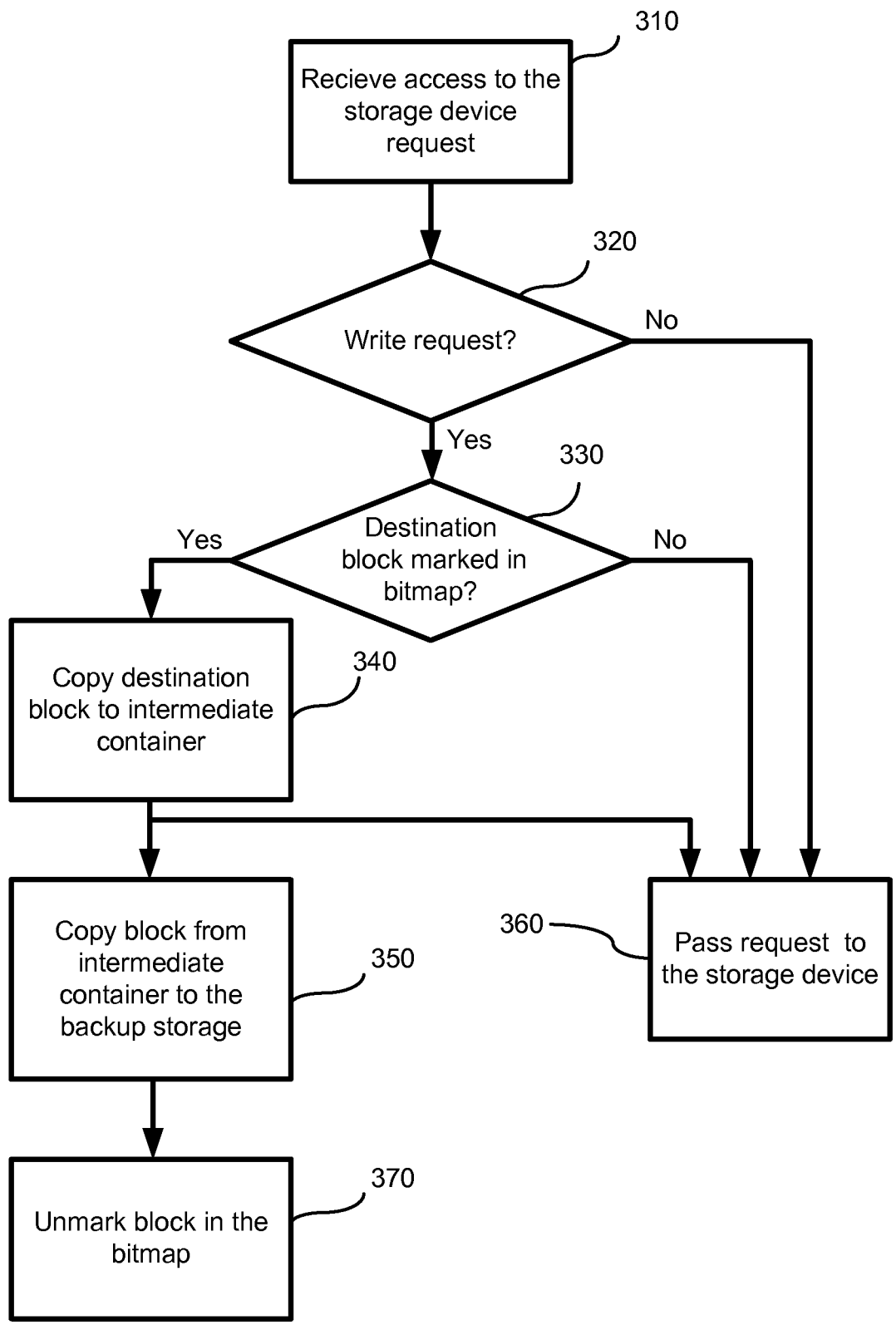
FIG. 3 illustrates a block diagram of a command flow during backup process, in accordance with the exemplary embodiment.

An operational flow of a backup process, in accordance with the exemplary embodiment, is illustrated in FIG. 3. A request for access to a storage device is received in step 310. The request is analyzed in step 320. If the access request is not a write operation request, then the request is passed onto the storage device in block 360. If the access request is a write request, then the request's destination block is analyzed in step 330.

If the request destination block is not marked in the bitmap, then the access request is passed on to the storage device in step 360. If the request destination block is marked in the bitmap, then the destination block is copied to the intermediate container in step 340 and then copied from the intermediate container to the backup storage in step 350. The destination block is then unmarked in the bitmap in step 370. The operations performed in steps 310-370 are repeated for each subsequent access request.

Figure 4:
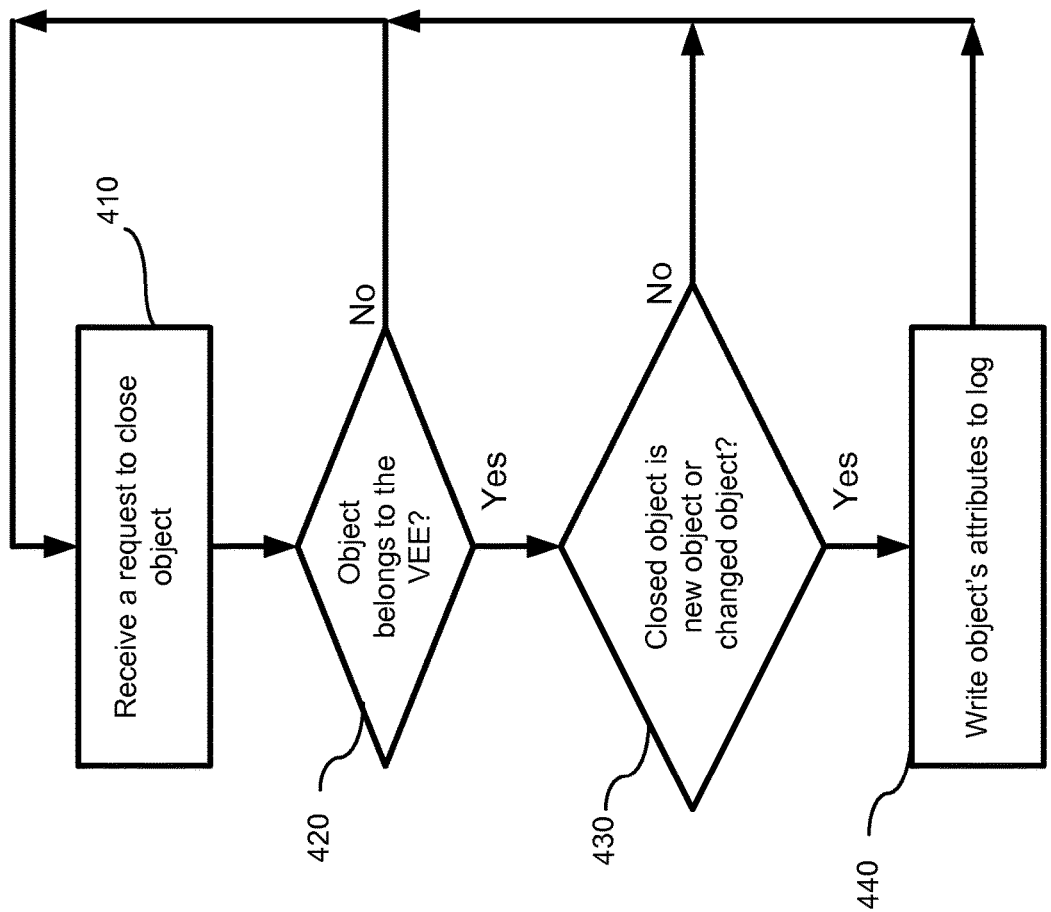
FIG. 4 illustrates a block diagram of object's attributes processing during backup process, in accordance with the exemplary embodiment.

The target VEE file system objects can have their attributes changed by user processes during the creation of a bitmap of the VEE file system. These changes in file attributes need to be tracked and reflected in the synchronized bitmap used for the incremental backup. An exemplary block diagram showing processing of file attributes is illustrated in FIG. 4. A request to close the object is received in step 410. In step 420 the request is analyzed.

If the requested object does not belong to the target VEE file system, then object attributes are not recorded. If the requested object belongs to the target VEE file system, then it is analyzed in step 430. If the requested object is not a new object or a changed object, then the object's attributes are not recorded. If the requested object is a new object or changed object, then object's attributes are written to directory log in step 440. The operations performed in steps 410-440 are repeated for each subsequent request.

Figure 5:
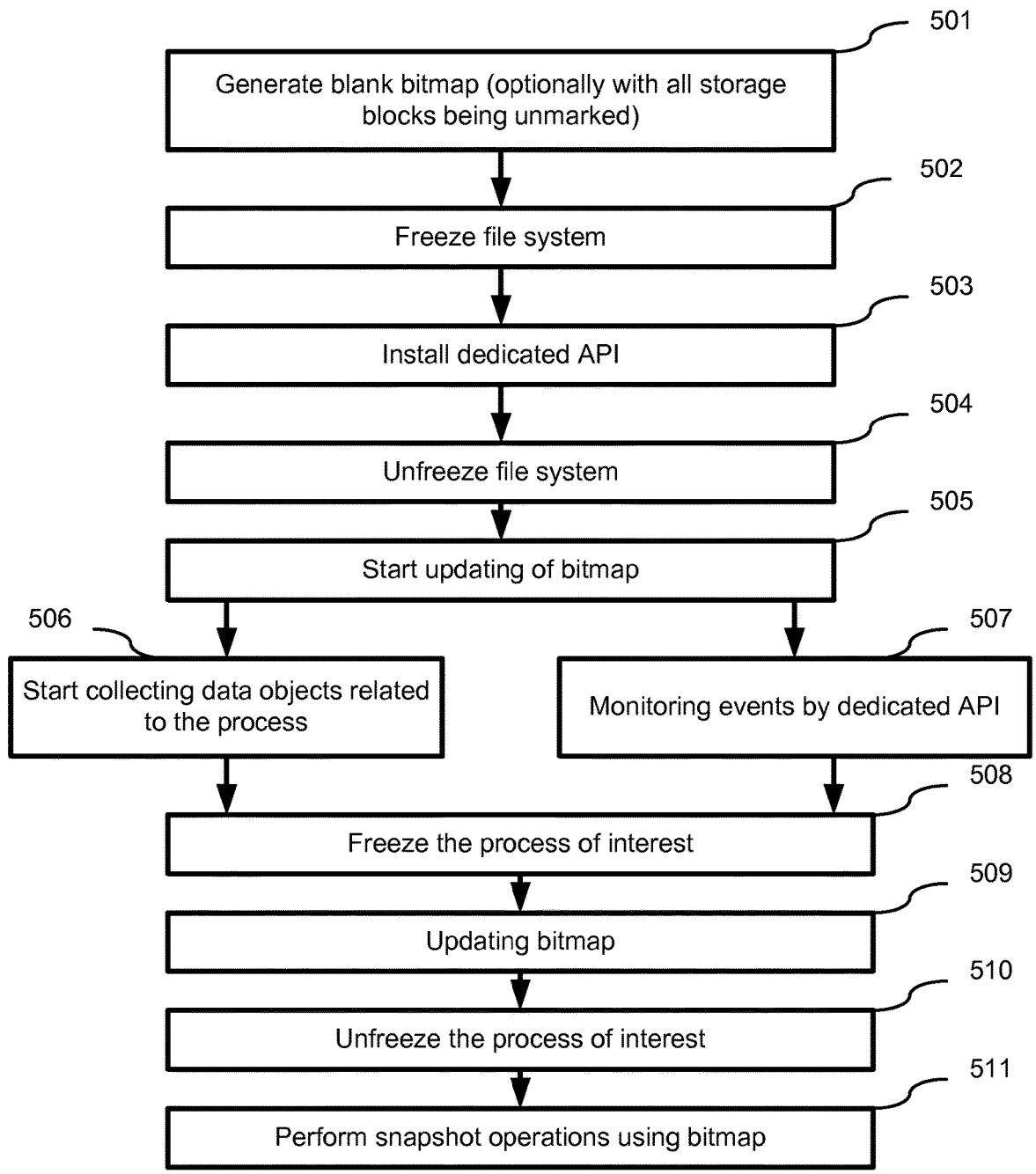
FIG. 5 illustrates a flow chart of a procedure of snapshot bitmap creation, in accordance with the exemplary embodiment.

A flow chart reflecting the exemplary embodiment of the procedure of snapshot bitmap creation is illustrated in FIG. 5. In step 501, the blank bitmap of the blocks of the storage device is initialized. The bitmap is generated to keep track of which blocks are handled by the process of interest, and which ones are unaffected. Before the backup process is started, all blocks of the bitmap are unmarked.

Then the file system is frozen in step 502. The bitmap is updated to indicate that the contents of the block have changed. The bitmap updating is managed by means of dedicated API, and is the reason why the dedicated API is required to be installed before the bitmap will be changed. Thus, the dedicated API is installed in step 503. When the dedicated API is ready to be used the file system resumes its normal operation in step 504.

The bitmap updating process is started in step 505. The bitmap reflects the blocks of the storage device that should be monitored by the dedicated API during the snapshot procedure in step 507. Each event that is called to the storage system is kept track of to create full bitmap touched by the process of interest. Also, the collecting of data objects related to the process of interest is started and this is executed in parallel with the monitoring operation in step 506. The bitmap updating, in accordance with the exemplary embodiment, can comprise three procedures running in parallel for indication of the blocks involved in the process.

When the last blocks are affected by the process, the result of bitmap checking is ready to be used. Before the process of interest is resumed in step 508, the verification of all changes of the blocks provided by the process previously is performed by the dedicated API and the bitmap is updated in step 509. The process of interest is frozen, while the bitmap is updated according to the latest changes of the blocks.

Then, the process of interest is started again in step 510, and the bitmap can be used to perform the snapshot procedure using the bitmap in step 511. After the end of the snapshot procedure, the dedicated API can be removed.

Those skilled in the art will appreciate that the exemplary embodiment provides for a fast and efficient generation of a bitmap of snapshot of VEE file system without freezing the VEE file system for the entire time of generation of a bitmap used for a backup.

Figure 6:
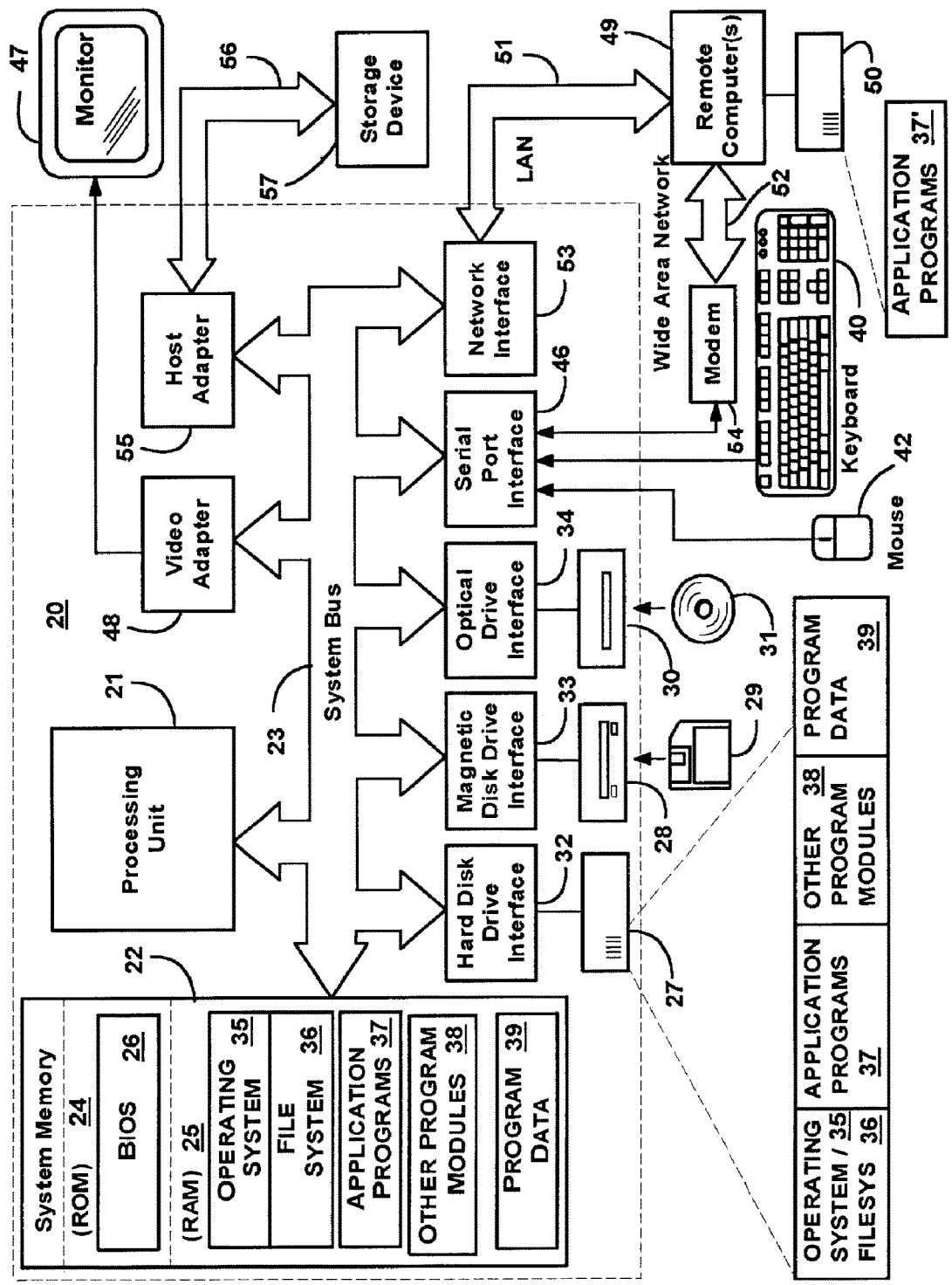
FIG. 6 illustrates an exemplary computer system on which the invention may be implemented.

With reference to FIG. 6, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 5. The logical connections depicted in FIG. 5 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and system have been achieved. In particular, it should be appreciated by those skilled in the art that system and method, according to the exemplary embodiments, provides for a fast and efficient backup of VEE file system without freezing the VEE file system for the entire time of generation of a backup.

It should also be appreciated that various modifications, adaptations, and alternative embodiments thereof may be made within the scope and spirit of the present invention. The invention is further defined by the following claims.

What is claimed is:

1. A system for tracing states of Virtual Execution Environments (VEEs), the system comprising:
   a computer system including a processor and a memory;
   a host operating system (OS) running on the computer system;
   a first VEE running under the host OS, wherein the first VEE provides services to remote users and has a first VEE file system; and
   a designated VEE given additional privileges to access hardware of the computer system by a host-side software component and running a tracing application that generates snapshots by
   (a) creating a bitmap of the first VEE file system and tracking changes of files of the first VEE file system,
   (b) tracing the changes of the files, (c) freezing writes to the first VEE file system,
(d) updating the bitmap according to the tracing,
(e) generating a file-based snapshot of the first VEE file system based on the bitmap, and
(f) unfreezing the writes to the first VEE file system, wherein the host OS, the first VEE and the designated VEE all execute on the processor of the computer system.

2. The system of claim 1, wherein the designated VEE provides backup services to the plurality of VEEs running on a cluster of computer systems.

3. The system of claim 2, wherein incremental backups generated by the backup services use bitmaps of the file system snapshots to identify files that need to be backed up.

4. The system of claim 2, wherein incremental backups generated by the backup services are generated in response to VEE user requests.

5. The system of claim 1, wherein write operations for at least one other VEE are continued when the steps
(c) freezing writes to the first VEE file system,
(d) updating the bitmap according to the tracing,
(e) generating a snapshot of the first VEE file system based on the bitmap, and
(f) unfreezing the writes to the first VEE file system, are performed.

6. The system of claim 1, wherein the snapshot in step (e) is generated as a next snapshot of the target VEE's file system based on the bitmap of the file system snapshot and a prior snapshot.

7. The system of claim 1, wherein a consistent snapshot of the VEE's file system is generated as a snapshot of a VEE image file containing the VEE's file system.

8. The system of claim 1, wherein a consistent snapshot of the VEE's file system is generated for the VEE's file system from within the VEE.

9. A computer-implemented method for generation of incremental backup of Virtual Execution Environment (VEE), comprising:
(a) activating a first VEE under a host OS, wherein the first VEE provides services to remote users and has a first VEE file system; and
(b) activating a designated VEE given additional privileges to access hardware of the computer system by a host-side software component and running a tracing application that generates file-based snapshots by
(i) creating a bitmap of the first VEE file system and tracking changes of files of the first VEE file system,
(ii) tracing the changes of the files and updating the bitmap according to the tracing,
(iii) freezing writes to the first VEE file system,
(iv) generating a snapshot of the first VEE file system based on the bitmap, and
(v) unfreezing the writes to the first VEE file system, wherein the host OS, the first VEE and the designated VEE all execute on the same processor of a computer system.

10. The method of claim 9, wherein the designated VEE provides backup services to the plurality of target VEEs running on a cluster of computer systems.

11. The method of claim 10, wherein an incremental backup generated by the backup services is generated in response to target VEE user request.

12. The method of claim 10, wherein an incremental backup generated by the backup services is generated automatically according to a pre-defined schedule.

13. The method of claim 9, wherein the changes of files of the target VEE file system are caused by VEE user processes.

14. A system for generation of incremental backups of Virtual Execution Environments (VEEs), the system comprising:
a processor;
a memory coupled to the processor;
a computer code loaded into the memory and executed on the processor for implementing the following functionality:
activating a first VEE under a host OS, wherein the first VEE provides services to remote users and has a first VEE file system; and
activating a designated VEE and giving the designated VEE additional privileges to access hardware of the computer system by a host-side software component and running a tracing application that generates file-based snapshots by
(a) creating a bitmap of the first VEE file system and tracking changes of files of the first VEE file system,
(b) tracing the changes and updating the bitmap,
(c) freezing writes to the first VEE file system,
(d) generating a snapshot of the first VEE file system based on the bitmap, and
(e) unfreezing the writes to the first VEE file system, wherein the host OS, the first VEE and the designated VEE all execute on the processor of the computer system.

15. A system for tracing states of Virtual Execution Environments (VEEs), the system comprising:
a processor and a memory;
a host operating system (OS) running on the processor;
a plurality of isolated VEEs running under the host OS, wherein the VEEs provide services to remote users, and wherein each VEE has a VEE file system; and
a backup VEE given additional privileges to access file systems of the isolated VEEs and running a backup application that generates file-based backups by
(a) creating a bitmap of a target VEE file system and tracking changes of files of the target VEE file system,
(b) recording the changes of the files,
(c) freezing writes to the target VEE file system,
(d) updating the bitmap according to the changes of the files,
(e) generating the backup of the target VEE files system based on the bitmap,
(f) during the backup process
(A) protecting data to be backed up by copying the data to an intermediate container;
(B) copying data to be backed up either from original storage or from the intermediate container to the backup;
(C) making the intermediate container inactive once the backup is complete; and
(f) releasing the writes to the target VEE file system, wherein the host OS, the first VEE and the designated VEE all execute on the processor.

* * * * *